(12) United States Patent (10) Patent No.: US 8,452,052 B2
Erignac (45) Date of Patent: May 28, 2013

(54) MODELING MOTION CAPTURE VOLUMES WITH DISTANCE FIELDS

(75) Inventor: Charles A. Erignac, Seattle, WA (US)

(73) Assignee: The Boeing Company, Chicago, IL (US)

(*) Notice: Subject to any disclaimer, the term of this patent is extended or adjusted under 35 U.S.C. 154(b) by 1359 days.

(21) Appl. No.: 12/017,111

(22) Filed: Jan. 21, 2008

(65) Prior Publication Data

US 2009/0185719 A1 Jul. 23, 2009

(51) Int. Cl.
*G06K 9/00* (2006.01)

(52) U.S. Cl.
USPC ........... 382/104; 382/107; 382/154; 345/419; 356/12; 348/42; 348/143

(58) Field of Classification Search
USPC ................. 382/100, 104, 154, 285, 107, 103; 345/419–427; 356/12–14; 348/42–60, 143–160
See application file for complete search history.

(56) References Cited

U.S. PATENT DOCUMENTS

| | | | | |
|---|---|---|---|---|
| 5,495,576 A * | 2/1996 | Ritchey | | 345/420 |
| 5,638,461 A * | 6/1997 | Fridge | | 382/141 |
| 5,729,471 A * | 3/1998 | Jain et al. | | 725/131 |
| 5,745,126 A * | 4/1998 | Jain et al. | | 382/154 |
| 5,847,711 A * | 12/1998 | Kaufman et al. | | 345/424 |
| 5,850,352 A * | 12/1998 | Moezzi et al. | | 345/419 |
| 6,057,847 A * | 5/2000 | Jenkins | | 345/422 |
| 6,297,763 B1 * | 10/2001 | Thomson et al. | | 342/75 |
| 6,313,841 B1 * | 11/2001 | Ogata et al. | | 345/424 |
| 6,525,729 B1 * | 2/2003 | Akerman et al. | | 345/426 |
| 6,685,366 B1 * | 2/2004 | Corbin | | 396/427 |
| 7,259,778 B2 * | 8/2007 | Arpa et al. | | 348/139 |
| 7,643,893 B2 * | 1/2010 | Troy et al. | | 700/65 |
| 8,184,157 B2 * | 5/2012 | Mittal | | 348/143 |
| 2002/0130858 A1 * | 9/2002 | Perry et al. | | 345/420 |
| 2003/0132939 A1 * | 7/2003 | Moshe et al. | | 345/474 |
| 2004/0225480 A1 * | 11/2004 | Dunham | | 703/1 |
| 2005/0002662 A1 * | 1/2005 | Arpa et al. | | 396/120 |
| 2005/0125099 A1 * | 6/2005 | Mikami et al. | | 700/245 |
| 2005/0134499 A1 * | 6/2005 | Liu et al. | | 342/75 |
| 2005/0151759 A1 * | 7/2005 | Gonzalez-Banos et al. | | 345/647 |
| 2005/0275914 A1 * | 12/2005 | Vesely et al. | | 359/13 |
| 2007/0248350 A1 * | 10/2007 | Baker et al. | | 396/322 |
| 2008/0007720 A1 * | 1/2008 | Mittal | | 356/138 |
| 2008/0033684 A1 * | 2/2008 | Vian et al. | | 702/113 |
| 2008/0118143 A1 * | 5/2008 | Gordon et al. | | 382/154 |
| 2008/0133190 A1 * | 6/2008 | Peretz et al. | | 703/6 |
| 2008/0235628 A1 * | 9/2008 | Faught | | 715/848 |
| 2009/0185719 A1 * | 7/2009 | Erignac | | 382/104 |

(Continued)

FOREIGN PATENT DOCUMENTS

EP 1 241 621 9/2002

OTHER PUBLICATIONS

Schouwenaars et al. "Multi-Vehicle Path Planning for Non-Line of Sight Communication" Proceedings of the 2006 American Control Conference Minneapolis, Minnesota, USA, Jun. 14-16, 2006.*

(Continued)

*Primary Examiner* — Aaron W Carter
(74) *Attorney, Agent, or Firm* — Hugh P. Gortler (57) ABSTRACT

A k-covered motion capture volume is modeled. The modeling includes representing the k-covered motion capture volume with a distance field.

32 Claims, 6 Drawing Sheets

U.S. PATENT DOCUMENTS

| | | | |
|---|---|---|---|
| 2010/0239186 A1* | 9/2010 | Fowler et al. | 382/291 |
| 2010/0259539 A1* | 10/2010 | Papanikolopoulos et al. | 345/420 |
| 2010/0328436 A1* | 12/2010 | Skubic et al. | 348/47 |
| 2011/0035199 A1* | 2/2011 | Kristofik et al. | 703/6 |
| 2011/0058167 A1* | 3/2011 | Knox et al. | 356/338 |
| 2011/0169830 A1* | 7/2011 | D'Amora | 345/424 |
| 2011/0181592 A1* | 7/2011 | Rhodes | 345/426 |
| 2012/0039526 A1* | 2/2012 | Garaas et al. | 382/154 |
| 2012/0123563 A1* | 5/2012 | Drinkard | 700/13 |
| 2012/0166161 A1* | 6/2012 | Holland | 703/2 |
| 2012/0197600 A1* | 8/2012 | Bai et al. | 703/1 |
| 2012/0262554 A1* | 10/2012 | Gotsman et al. | 348/47 |
| 2013/0051623 A1* | 2/2013 | Ofek et al. | 382/103 |

OTHER PUBLICATIONS

Troy, J.; Erignac, C. & Murray, P. Closed-Loop Motion Capture Feedback Control of Small-Scale Aerial Vehicles Proceeding AIAA Infotech@Aerospace Conference, 2007.

Jiménez, P.; Thomas, F. & Torras, C. 3D Collision Detection: A Survey Computers and Graphics, 2001, 25, 269-285.

McNeely et., Six DOF haptic rendering using voxel sampling SIGGRAPH '99, ACM Press/Addison-Wesley Publishing Co., 1999, 401-408.

Frisken et al., Adaptively Sampled Distance Fields: A General Representation of Shape for Computer Graphics, Mitsubishi Electric Research Lab, TR2002-15,Cambridge, MA, Dec. 2000.

U.S. Appl. No. 11/459,631, filed Jul. 24, 2006.

Gokul Varadhan: "Accurate sampling-based algorithms for surface extraction and motion planning" 2005, Univesity of North Carolina, Chapel Hill, pp. 10-16, XP002551435.

Deepak Ganesan: "Structured Placement of Sensor Networks" Aug. 25, 2005, http://www.cse.unt.edu/~rakl/class5540/Placement.pdf.

Liang Liu et al: "On Directional K-Coverage Analysis of Randomly Deployed Camera Sensor Networks" May 19, 2008, Communications. 2008. ICC '08. IEEE International Conference on, IEEE, Piscataway, NJ, pp. 2707-2711. ISBN: 978-1-4244-2075-9.

Ammari H M et al: "Joint k-Coverage and Hybrid Forwarding in Duty-Cycled Three-Dimensional Wireless Sensor Networks" Sensor, Mesh and AD HOC Communications and Networks, 2008. SECON 'OS. 5TH Annual IEEE Communications Society Conference on, IEEE, Piscataway, NJ. USA. Jun. 16, 2008, pp. 170-178, ISBN: 978-1-4244-1777-3.

* cited by examiner

MODELING MOTION CAPTURE VOLUMES WITH DISTANCE FIELDS

BACKGROUND

Motion capture ("mocap") is a technique of digitally recording movements for entertainment, sports, and medical applications. In the context of filmmaking (where it is sometimes called performance capture), motion capture involves recording the actions of human actors, and using that information to animate digital character models in 3D animation.

In a typical motion capture system, an array of sensors is distributed around a motion capture stage, where a person's motion is recorded. The person wears either passive markers or active beacons that are individually tracked by the sensors. A central processor fuses data from the sensors and computes the person's body position based on the marker data and a-priori information about the marker position on the person's body.

The movements are recorded within a "capture volume." This volume refers to the workspace where the person can be tracked continuously by a certain sensor configuration. For instance, if a person can be tracked continuously within a capture volume by three cameras, that capture volume is said to have 3-coverage.

A motion capture system may be used for closed loop control of a vehicle (e.g., an electric helicopter) within a capture volume. However, visualization and analysis of the capture volume is limited.

SUMMARY

According to an embodiment of the present invention, a k-covered motion capture volume is modeled. The modeling includes representing the k-covered motion capture volume with a distance field.

DETAILED DESCRIPTION

Figure 1:
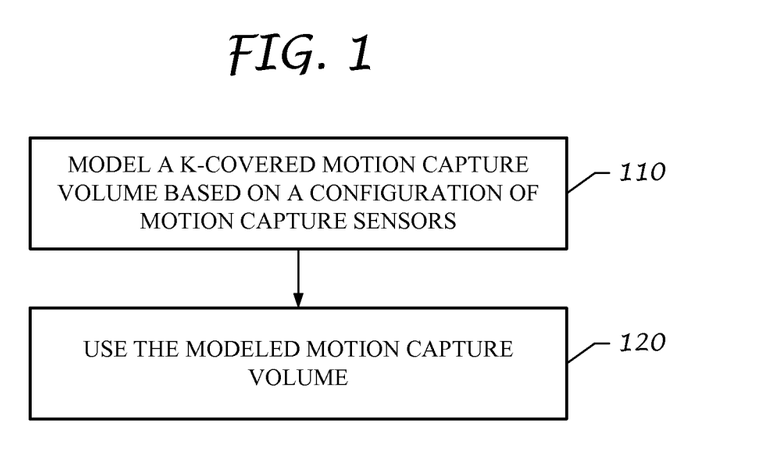
FIG. 1 is an illustration of a method in accordance with an embodiment of the present invention.

Reference is made to FIG. 1. At block 110, a computational model of a k-covered motion capture volume is generated. The model is based on a configuration of motion capture sensors. The model generation includes representing the k-covered motion capture volume with a distance field.

Let $C^k$ denote a k-covered motion capture volume for a motion capture system comprising a set C of sensors (e.g., cameras) in a specific configuration. This set C represents information about a portion of a workspace (the "viewing volume") that is viewed by each sensor (e.g., parameters such as the position, orientation and field of view of each camera with respect to the workspace). A distance field is a scalar function $f_C^k: R^3 \to R$ denoting the minimum distance from a point p in $R^3$ to a boundary of the capture volume $C^k$. The distance field may be signed such that $f_C^k(p)$ is positive if the point p is inside of the capture volume, and negative if the point p is outside the capture volume $C^k$. The distance field is zero if the point p lies on the boundary of the capture volume $C^k$.

An algorithm for evaluating $f_C^k$ at a given point is computationally intensive due to the complex geometry of the capture volume (e.g., a multi-faceted boundary with very little symmetry). However, this function $f_C^k$ may be approximated with an interpolation technique using regularly or adaptively sampled values of $f_C^k$ within a workspace containing the capture volume. One embodiment of the present invention may use adaptive distance fields (ADFs) to model the capture volume $C^k$ as an approximation $h_C^k$ of $f_C^k$. In an adaptive distance field, sampling may be performed at higher rates in regions where the distance field contains fine detail and at lower sampling rates where the distance field varies smoothly.

At block 120, the model can be used for a wide range of applications, examples of which will be provided below. These examples include a motion capture system and a system for controlling of a vehicle to operate within a confined volume.

Figure 2:
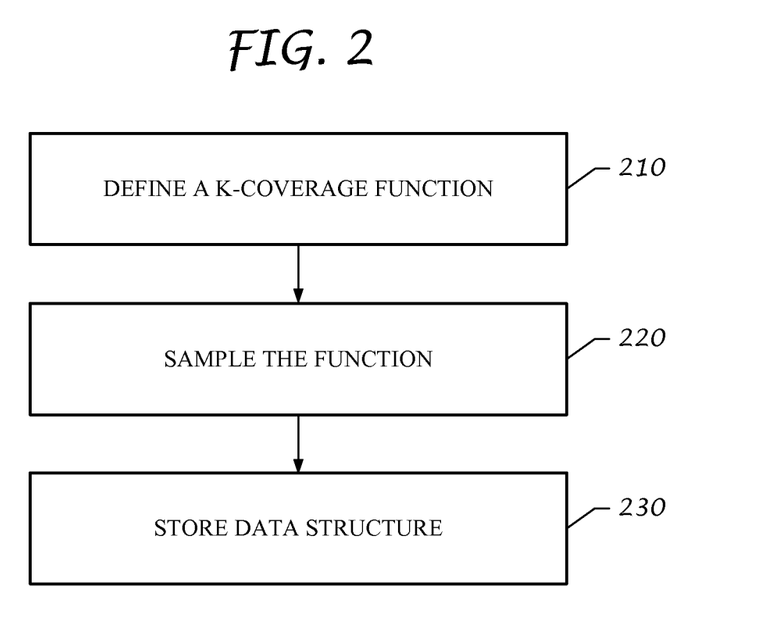
FIG. 2 is an illustration of a method of modeling a capture volume in accordance with an embodiment of the present invention.

Reference is made to FIG. 2, which illustrates an example of modeling a motion capture volume based on a sensor configuration. The configuration includes a plurality of sensors distributed around a workspace. The sensors are not limited to any particular type. The sensors may include, but are not limited to, magnetic, ultrasonic, and optical sensors.

Each sensor has parameter settings that include field of view, placement, and orientation. The settings of a sensor can be used to identify that portion (that is, the viewing volume) of the workspace sensed by the sensor.

Figure 3:
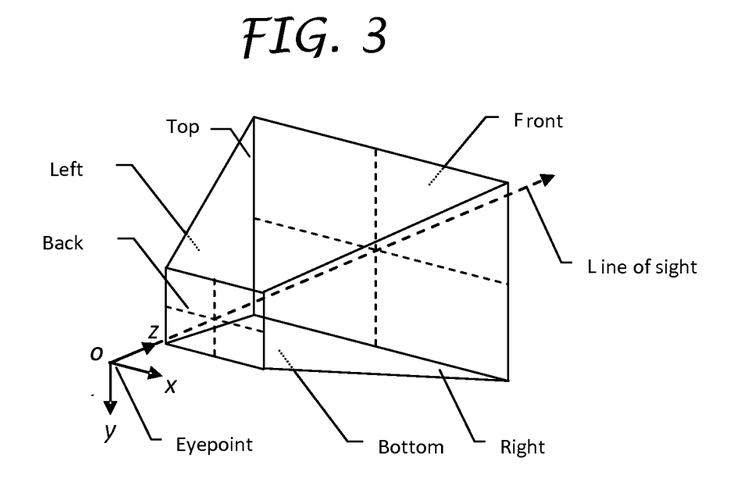
FIG. 3 is an illustration of an example of a viewing volume of a sensor.

The volume viewed by a sensor such as a camera can be modeled as a frustum. The frustum illustrated in FIG. 3 is bounded by a set of six clipping planes $P_i = \{$Left, Right, Top, Bottom, Front, Back$\}$. The eyepoint $o_i$ defines the origin of the camera's local coordinate system where the z axis support's the camera's line of sight. The Back and Front planes are perpendicular to z, and the Left and Right planes intersect at the eyepoint $o_i$ along the y axis. Their dihedral is the camera's horizontal field of view. The Top and Bottom planes intersect at $o_i$ along the x axis. Their dihedral corresponds to the camera's vertical field of view.

Each clipping plane in $P_i$ defines a half-space and is oriented with its normal pointing inside the frustum. Thus, the frustum is formed by the intersection of all six half-spaces.

At block 210, a k-coverage function $f_C^k$ is defined, based on the sensor configuration. Consider the example of 3-coverage by a set C of n cameras, where each camera has a viewing volume that is modeled as a frustum. Given an oriented plane P and its associated half-space $H_P$, a signed distance function $d_P: R^3 \to R$ is defined such that $$d_P(q) = \begin{cases} dist_P(q) & \text{if } q \in H_P \\ -dist_P(q) & \text{otherwise} \end{cases}$$

where distp(q) computes the Euclidian distance between P and a point q.

Let $f_i: R^3 \to R$ be the coverage function of camera $c_i$ such that $f_i(q) = \min_{P \in P_i}(d_P(q))$. This function is positive for points inside the frustum, null for those at its boundary and negative outside of it. Furthermore, because the frustum is convex, the positive values of $f_i$ are actual Euclidian distances to the boundary of the frustum. This does not hold for negative values of $f_i$.

Let covers: $R^3 \to \{true, false\}$ be the predicate that is true for a point q if and only if q is in the field of view of camera $c_i$. This is equivalent to $cover_i(q) \Leftrightarrow f_i(q) \geq 0$ Let $cover_C^k: R^3 \to \{true, false\}$ be the predicate that is true for a point q if and only if q is in the field of view of at least k distinct cameras of C. This is equivalent to $$cover_C^k(q) \Leftrightarrow \exists C_q \subseteq C, |C_q| \geq k \text{ and } \forall c_i \in C_q, cover_i(q)$$

where $C_q$ is he subset of cameras covering point q.

Let $f_C^k: R^3 \to R$ be the function that for a point q returns the $k^{th}$ largest value of $f_i(q)$ for $i \in 0, \ldots, n-1$. If $f_C^k(q) \geq 0$ then there exist a set $C'_q = \{c_0, \ldots, c_{k-1}\}$ of k cameras where $\forall c_j \in C'_q, f_j(q) \geq 0$. Thus, $f_C^k(q) \Leftrightarrow cover_C^k(q)$, where the value of $f_C^k$ indicates whether a point is k-covered by C. $B_C^k = \{q \in R^3 | f_C^k(q) = 0\}$ is the boundary of the capture volume where k-coverage is required. The $k^{th}$ largest value is used as an approximation of the distance to the capture volume's boundary.

Thus, a point q is k-covered if there is a k-tuple of cameras whose frustum intersection contains that point. Those k-tuple intersections have convex boundaries because they are the convex hulls of all the planes forming the frusta of the cameras in the k-tuple.

The capture volume is the union of these intersections. Thus, the distance function $f_C^k$ describes a capture volume that is possibly concave prismatic and that might have disconnected components.

The distance function $f_C^k$ of each sensor is evaluated only once. Since the function $f_C^k$ evaluates each camera only once, it has O(n) complexity to compute. The function $f_C^k$ is a pseudo signed distance function to $B_C^k$ because it only does k-tuple-wise computations and does not considers their union. Its zero-contour (iso-surface for field value 0) is the boundary of the capture volume $C^k$.

At block 220, the k-coverage function $f_C^k$ is sampled. Let $h_C^k$ be the ADF obtained by sampling $f_C^k$ with a user-defined sampling error E and maximum depth $d_{max}$. The sampling begins with a root cell 410 that contains the frusta of the camera set C so as to encapsulate the entire capture volume. The root cell 410 has a depth of d=0.

Starting from the root cell the following process is applied to each cell. The function $f_C^k$ is evaluated at the eight vertices located at the corners of this cell. Let h be a scalar field defined within the boundaries of the cell. This field may be computed via trilinear interpolation of the eight samples as described below. Next it is verified that, within the cell, the scalar field h approximates the function $f_C^k$ within the maximum sampling error $\epsilon$. This may be done by computing the absolute value of the difference of the two fields at predefined test points such as the center of the cell. If one of these differences exceeds the sampling error E and the depth d of the cell is less than $d_{max}$ then the cell is subdivided into eight child cells. The depth of these child cells is d+1. This algorithm is applied recursively to these child cells. A cell without children is referred to as a "leaf" cell.

This subdivision is repeated until the leaf cells can interpolate the distance function $f_C^k$ within the predefined sampling error E or until a maximum depth is reached. Thus, the sampling process adaptively subdivides the cells to keep the local interpolation error bounded by a user-defined tolerance.

Figure 4A:
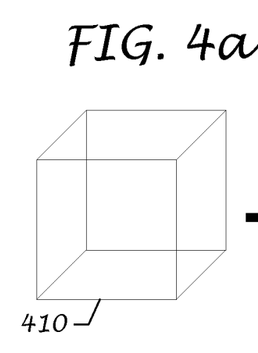
FIGS. 4a-4c are illustrations of recursive subdivision of a root cell.
Figure 4B:
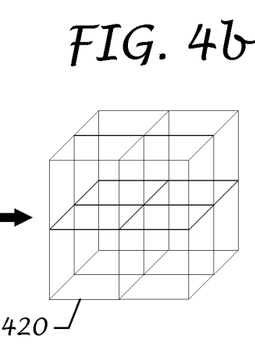
Figure 4C:
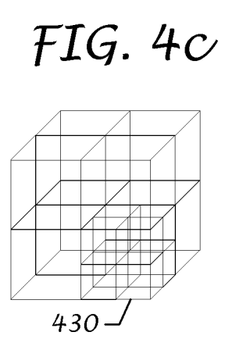

Additional reference is made to FIGS. 4*a*-4*d*, which illustrates a recursive subdivision. FIG. 4*a* illustrates the root cell 410 of the ADF. FIG. 4*b* illustrates the root cell 410 subdivided into eight child cells 420 having a depth d=1, and FIG. 4*c* illustrates one of the cells 420 further subdivided into cells 430 having a depth of d=2. Cells at the same depth (siblings) have the same size.

Figure 4D:
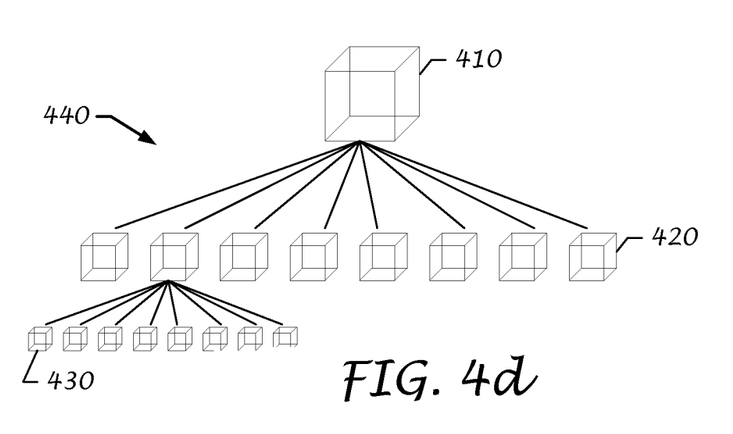
FIG. 4d is an illustration of a data structure representing the recursive subdivision.

This recursive subdivision can be represented by a data structure such as a tree structure. For example, the recursive subdivision of FIGS. 4*a*-4*c* can be represented by an octree as illustrated in FIG. 4*d*. The evaluation process traverses the tree quickly down to the leaf containing the input point and linearly interpolates the field at that location based on the sampled field values at the eight vertices of the leaf.

Figure 11:
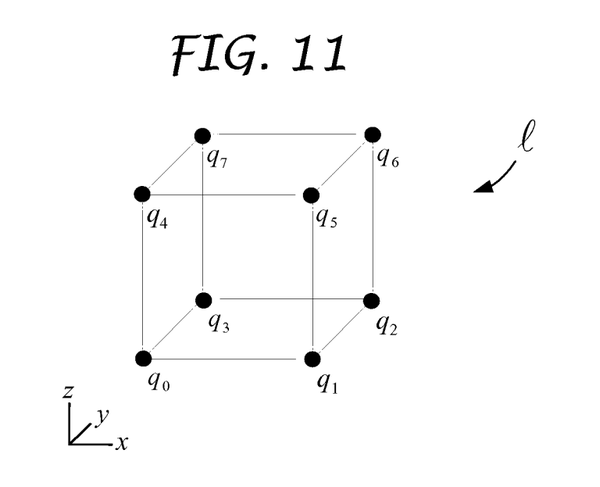
FIG. 11 is an illustration of a leaf cell.

Additional reference is made to FIG. 11. A distance field or distance field gradient (or both) may be interpolated within a cell. Each cell l has eight vertices located at its corners (q0, q1, q2, q3, q4, q5, q6, q7). These vertices are shared with the adjacent cells. A value of the distance function $f_C^k$ is stored for each vertex location. This value was computed during the sampling step.

Distance fields may be interpolated as follows. Given a point p contained in the domain of an ADF h, h(p) is evaluated by trilinear interpolation of the sample values associated with the deepest leaf l containing p. Let $Q_l = \{q_0, q_1, q_2, q_3, q_4, q_5, q_6, q_7\}$ and $H_l = \{h_0, h_1, h_2, h_3, h_4, h_5, h_6, h_7\}$ be the set of vertices and associated field values of leaf l. The distance field $h_l$ of leaf l is of the form $$h_\ell(p) = \sum_{i \in [0,7]} w_i h_i$$

where $(w_0, w_1, w_2, w_3, w_4, w_5, w_6, w_7)$ are the barycentric coordinates of p with respect to $Q_l$. A leaf l is mapped to the unit cube $[0,1]^3$ by defining a normalized coordinate system where its vertices have the following coordinates:

$q_0(0,0,0)$ $q_4(0,0,1)$
$q_1(1,0,0)$ $q_5(1,0,1)$
$q_2(1,1,0)$ $q_6(1,1,1)$
$q_3(0,1,0)$ $q_7(0,1,1)$

Let (x,y,z) be the normalized coordinates of point p in the leaf l. The formulae for the weights are:

$w_0 = 1 + xy + yz + xz - (xyz + x + y + z)$ $w_1 = xyz + x - (xy + xz)$ $w_2 = xy - xyz$ $w_3 = xyz + y - (xy + yz)$ $w_4 = xyz + z - (xz + yz)$ $w_5 = xz - xyz$ $w_6 = xyz$ $w_7 = yz - xyz$ with $$\sum_{i \in [0,7]} w_i = 1.$$

The function $h_l$ is defined only inside leaf l.

Distance field gradients may be interpolated as follows. Evaluating the gradient $\nabla h(p)$ is very similar to evaluating $h(p)$. The leaf l containing point p is located. The gradient of $h_l$, which is of the following form, is evaluated:

$$\nabla h_\ell(p) = \left[\frac{\partial h_\ell}{\partial x}(p), \frac{\partial h_\ell}{\partial y}(p), \frac{\partial h_\ell}{\partial z}(p)\right]^T$$

where $$\frac{\partial h_\ell}{\partial x}(p) = \sum_{i \in [0,7]} \frac{\partial w_i}{\partial x} h_i, \quad \frac{\partial h_\ell}{\partial y}(p) = \sum_{i \in [0,7]} \frac{\partial w_i}{\partial y} h_i,$$

$$\frac{\partial h_\ell}{\partial z}(p) = \sum_{i \in [0,7]} \frac{\partial w_i}{\partial z} h_i$$

with the weights given in Table 1.

TABLE 1

| | |
|---|---|
| $\frac{\partial w_0}{\partial x} = y + z - (yz + 1)$ | $\frac{\partial w_4}{\partial x} = yz - z$ |
| $\frac{\partial w_1}{\partial x} = yz + 1 - (y + z)$ | $\frac{\partial w_5}{\partial x} = z - yz$ |
| $\frac{\partial w_2}{\partial x} = y - yz$ | $\frac{\partial w_6}{\partial x} = yz$ |
| $\frac{\partial w_3}{\partial x} = yz - y$ | $\frac{\partial w_7}{\partial x} = -yz$ |
| $\frac{\partial w_0}{\partial y} = x + y - (xz + 1)$ | $\frac{\partial w_4}{\partial y} = xz - z$ |
| $\frac{\partial w_1}{\partial y} = xz - x$ | $\frac{\partial w_5}{\partial y} = -xz$ |
| $\frac{\partial w_2}{\partial y} = x - xz$ | $\frac{\partial w_6}{\partial y} = xz$ |
| $\frac{\partial w_3}{\partial y} = xz + 1 - (x + z)$ | $\frac{\partial w_7}{\partial y} = z - xz$ |
| $\frac{\partial w_0}{\partial z} = y + x - (xy + 1)$ | $\frac{\partial w_4}{\partial z} = xy + 1 - (x + y)$ |
| $\frac{\partial w_1}{\partial z} = xy - x$ | $\frac{\partial w_5}{\partial z} = x - xy$ |
| $\frac{\partial w_2}{\partial z} = -xy$ | $\frac{\partial w_6}{\partial z} = xy$ |
| $\frac{\partial w_3}{\partial z} = xy - y$ | $\frac{\partial w_7}{\partial z} = y - xy$ |

The evaluation of $h(p)$ and $\nabla h(p)$ can be efficiently combined in the same routine since the distance fields and gradients share the same octree traversal and barycentric coordinates computation.

ADFs are only $C^0$ continuous because of their linear interpolation scheme. They can faithfully reproduce fields with zero or small local curvatures. Areas of high curvature force the sampling algorithm to perform fine subdivision to meet the approximation tolerance.

The combination of detail directed sampling and the use of a spatial hierarchy for data storage allows ADFs to represent complex shapes to arbitrary precision while permitting efficient processing. ADFs can approximate complex distance fields by sampling them as a preprocessing step and replacing them in computations that require fast distance evaluations. ADFs are also a convenient neutral format to represent distance fields sampled from various solid representations such as polygonal meshes, parametric surfaces and constructive geometry.

At block 230, the data structure can be stored in computer memory for later use. For instance, the data structure may be saved as an XML file.

The sampling method just described is for adaptive distance fields. However, a method according to the present invention is not so limited. In some embodiments, non-adaptive (i.e., uniform) sampling could be performed by setting the maximum sampling error to zero. In some embodiments, sampling could be performed using a uniform grid.

In some embodiments, cells might have shapes (e.g., tetrahedral) other than cubes. In some embodiments, interpolation other than trilinear interpolation may be used. In some embodiments, gradients could be stored and fit to quadric surfaces. In general, other sampling methods may be used to approximate the distance function $f_C^k$.

A method according to an embodiment of the present invention is not limited to signed distance functions. In some embodiments, positive distance functions may be used. However, positive distance functions do not indicate whether a point is inside or outside a motion capture volume.

The method of FIG. 2 may be modified in other ways. In some embodiments, that part of the capture volume below the floor plane (z=0) may be clipped off since it is not in free space. Thus, the sampling is performed as $g_C^k(q) = \min(f_C^k(q), q.z)$ which is in the intersection between the half-space above z=0 and $f_C^k$.

The stored data structure is an approximation of the distance to a boundary of the motion capture volume. In some embodiments, however, the data structure may be further refined to determine a true signed distance function to a boundary of a motion capture volume.

Figure 5:
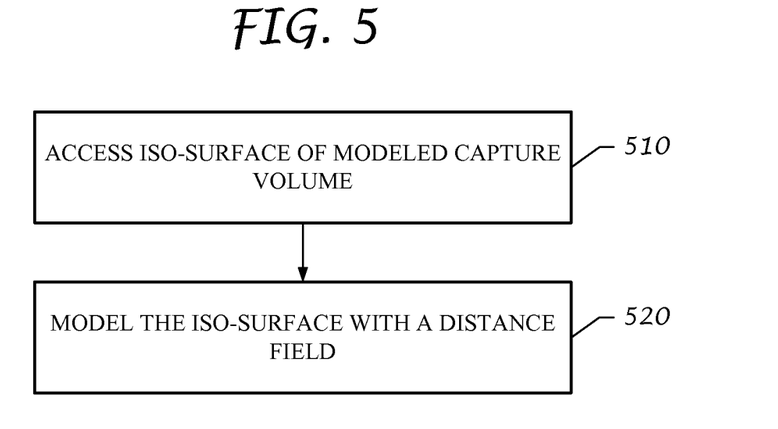
FIG. 5 is an illustration of a method of using a data structure to determine a true signed distance function to a boundary of a motion capture volume in accordance with an embodiment of the present invention.

Reference is made to FIG. 5, which illustrates a method of using a data structure to determine a true signed distance function to a boundary of a motion capture volume. Let $f_C^{k*}$ be the true signed distance function to the capture volume boundary $B_C^k$. The distance field can be derived by re-sampling a representation of the boundary $B_C^k$. To do so, the boundary $B_C^k$ is assumed to be orientable within the domain (the root voxel) of $h_C^k$. This means that each point in the domain is either inside or outside the capture volume and that every path between an inside point and an outside point goes through the boundary $B_C^k$.

At block 510, one or more iso-surfaces are extracted from the modeled capture volume. A suitable iso-surface extraction method can produce a triangular mesh that approximates the iso-surface. In some embodiments, however, this step may simply involve accessing a mesh model that was generated by some other means.

At block 520, the true distance function to the capture volume boundary is approximated by modeling the iso-surface with a distance field. In certain embodiments this intermediate distance function could use an oriented bounding box tree (OBBTree) to find the nearest triangle to the point at which the function $f_C^{k*}$ is evaluated. This re-sampling yields a second ADF $h_C^{k*}$. This second ADF $h_C^{k*}$ provides a true signed distance function to a boundary of a motion capture volume.

Figure 6:
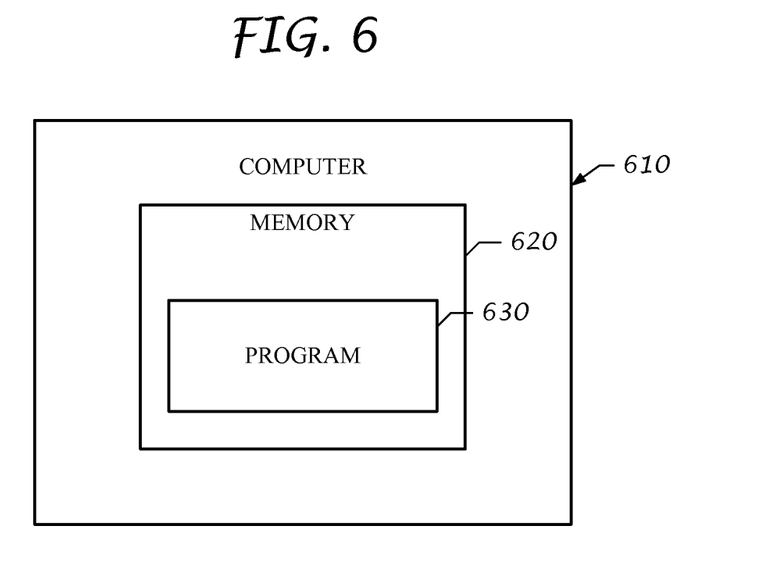
FIG. 6 is an illustration of an apparatus in accordance with an embodiment of the present invention.

Reference is made to FIG. 6. A method in accordance with an embodiment of the present invention may be implemented in a machine such as a computer 610. The computer 610 includes memory 620 that is encoded with a program 630. The program 630, when executed, causes the computer 610 to generate a computational model of a k-covered motion capture volume based on a configuration of motion capture sensors.

A modeled capture volume can be used for a wide range of applications. Two applications will be described below: a tool for motion capture, and a control for containing a vehicle within a closed volume.

Figure 7:
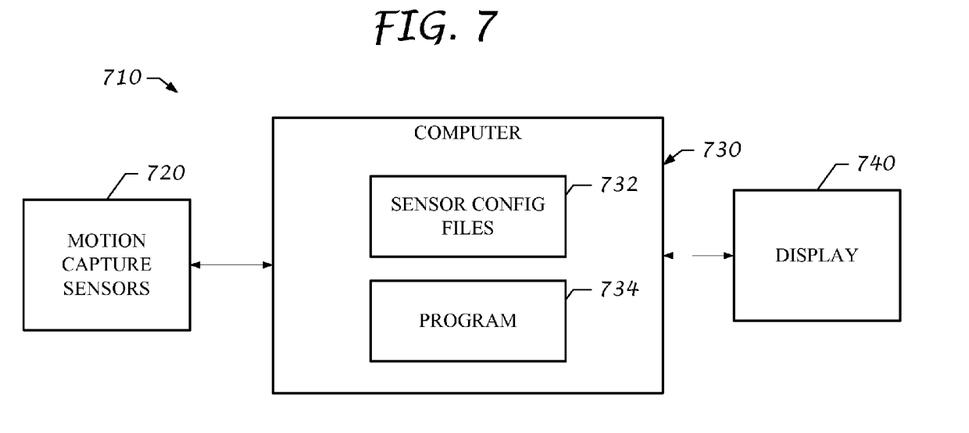
FIG. 7 is an illustration of a system in accordance with an embodiment of the present invention.
Figure 8:
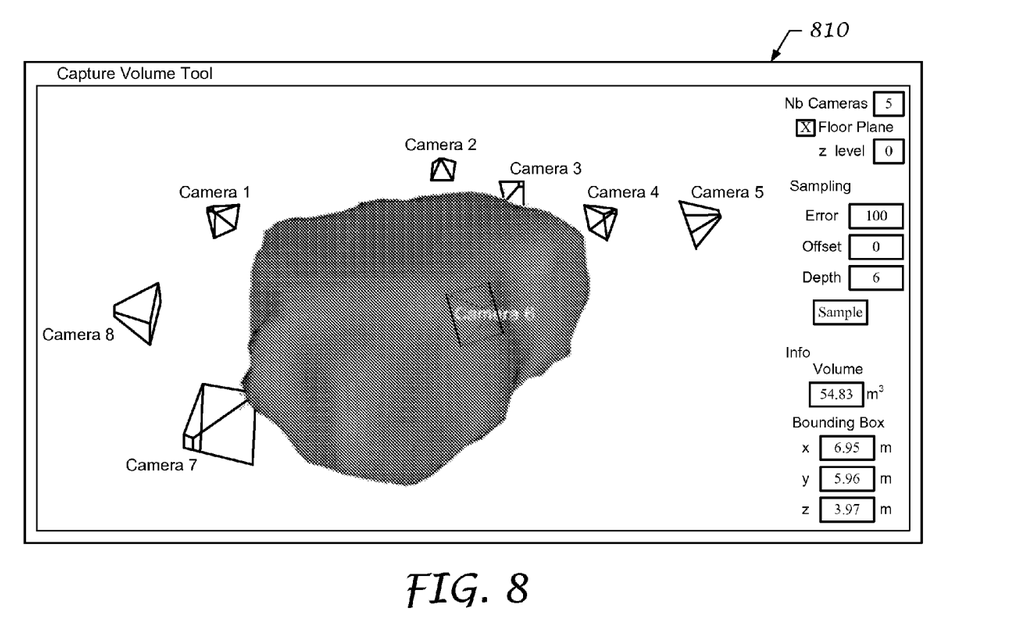
FIG. 8 is a screen shot of a motion capture tool in accordance with an embodiment of the present invention.

Reference is made to FIGS. 7 and 8, which illustrate a system 710 and tool 810 for motion capture. The system 710 includes a plurality of sensors 720, a motion capture computer 730, and a display 740. The sensors 720 have a particular configuration (placement, field of view, orientation, etc.), and the computer 730 stores a parameter file 732 describing the sensor configuration.

A desired coverage (i.e., the value of k) can be inputted to the computer 730. The computer 730 executes a program 734 that accesses the parameter file 732, models a k-coverage capture volume based on that file 732, and renders the modeled k-coverage volume.

ADF allows quick reconstruction of the model. For a model that is stored in an octree, distance values within a cell may be reconstructed from the eight corner distance values stored per cell using standard trilinear interpolation. In addition to distance values, an operation such as rendering may also require a method for estimating surface normals from the sampled data. For distance fields, the surface normal is equal to the normalized gradient of the distance field at the surface.

The program 734 can also cause the computer 730 to display a user interface of a motion capture tool 810. The user interface, in turn, may display an iso-surface of the modeled motion capture volume. The user interface allows a user to vary the sensor configuration. In response, the computer 730 may update the model and render the updated model.

The motion capture tool 810 can also compute the volume and bounding box of the motion capture volume. The computer 730 can then execute an algorithm that determines a sensor configuration with respect to the bounding box. For example, the computer 730 determines a number of sensors 720 that will be used, and also identifies sensor locations on the bounding box of the desired capture volume. For a motion capture stage, these locations may be on the floor plane for tripod mounted cameras or above ground, on walls, ceilings, dedicated struts, etc.

The motion capture tool 810 can be used to assess the quality of camera placement for various level of k-coverage. Users can use the feedback of this tool 810 to adjust the number, location and orientation of the cameras.

The motion capture tool 810 allows overlapping sensor coverage (or lack thereof) to be visualized. By varying the configuration, disjoint volumes can be merged to create a single volume with continuous coverage. And by varying the configuration, sensor overlap can be reduced to increase the volume that is covered.

Generating a computational model has other uses. For instance, motion capture activities can be limited to the computed volume. Moreover, sensor configurations can be evaluated prior to setup.

Figure 9:
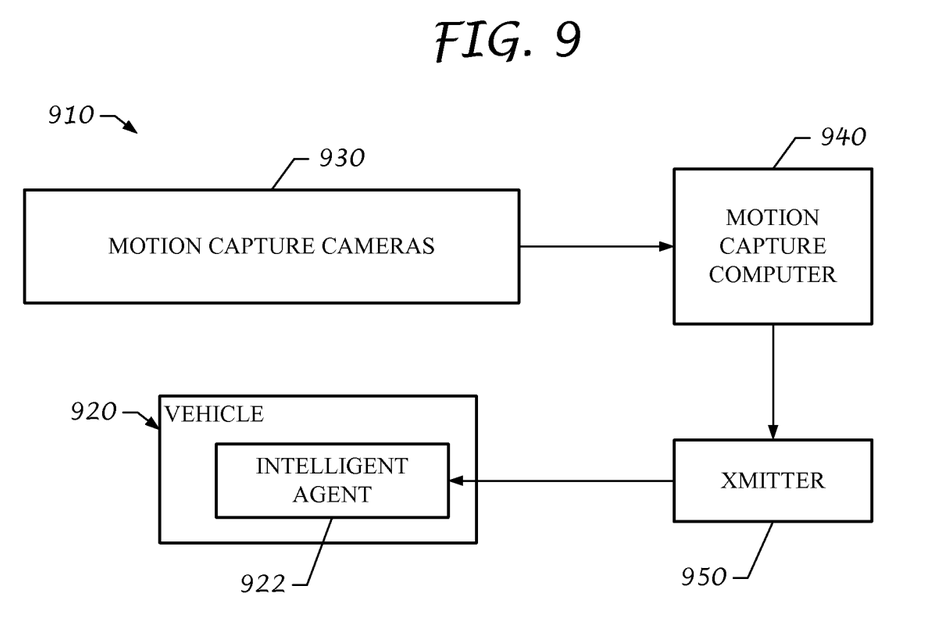
FIG. 9 is an illustration of a vehicle control system in accordance with an embodiment of the present invention.

Reference is now made to FIG. 9. A computational model of a k-covered volume can be used by a vehicle control system 910. The system 910 includes an intelligent agent 922 for controlling the operation of a vehicle 920 within a k-covered capture volume. In some embodiments, the intelligent agent 922 may include a microprocessor-based control that is on-board the vehicle 920 (as shown in FIG. 9). In other embodiments, the intelligent agent 922 may be in a computer (e.g., a flight computer) that is not on-board the vehicle 920.

The system 910 further includes a plurality of motion capture cameras 930 for collecting real time images of the vehicle 920, and a motion capture computer 940 for processing the real time images of the vehicle 920. Active or passive markers on the vehicle 920 may assist with the tracking.

The motion capture computer 940 tracks the vehicle 920 and computes tracking information such as real-time position and attitude. For instance, the motion capture computer 940 may triangulate the position of the markers attached to the vehicle 920 by intersecting lines of sight between several cameras 930. The motion capture computer 940 may then cluster the markers, and compare the clustered markers to known marker configurations (i.e., vehicle models). The motion capture computer 940 may perform filtering and other signal processing as well.

The motion capture computer 940 sends the tracking information to the intelligent agent 932. A transmitter 950 may be used to up-link the tracking information to an agent 922 that is on-board the vehicle 920.

The intelligent agent 922 uses the tracking information to control the operation of the vehicle 920. The intelligent agent 922 may use position, orientation, linear and angular velocity data, etc., to calculate error signals, which are then multiplied by feedback gain values, and then used to generate the control values for the vehicle's inner control loop and servos.

Figure 10:
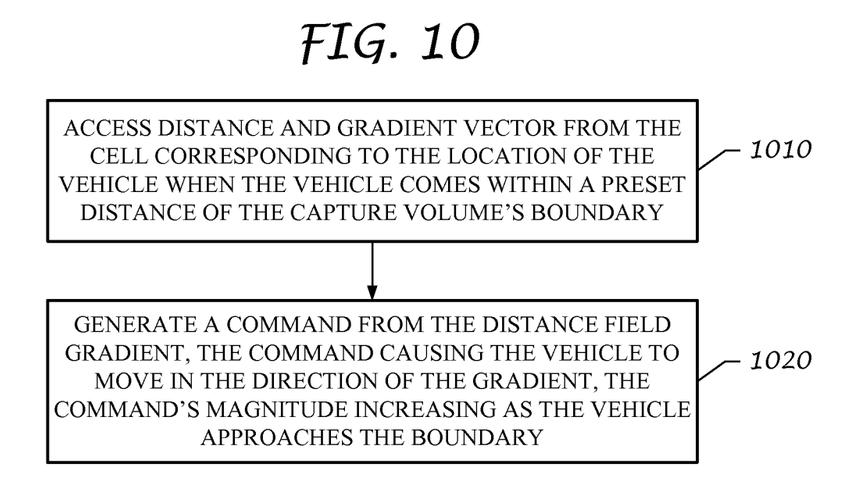
FIG. 10 is an illustration of a method of controlling a vehicle in accordance with an embodiment of the present invention.

Reference is now made to FIG. 10. The intelligent agent 922 may store one or more k-coverage models of the motion capture volume and use those models to confine the vehicle 920 to move autonomously or under remote operation inside the capture volume. When the vehicle 920 comes within a preset distance of the boundary of the capture volume, the intelligent agent 922 accesses distance and gradient vector from the cell corresponding to the location of the vehicle 922 (block 1010). A command is generated from the distance field and field gradient (block 1020). The command causes the vehicle to move in the direction of the gradient and its magnitude increases as the vehicle approaches the boundary. The gradient provides guidance to stay in the capture volume. It can be construed as a control input because the control loop will command the vehicle's velocity to line-up with the gradient.

Each k-coverage model represents a different coverage. For instance, the intelligent agent 922 might store 3-coverage, 4-coverage and 5-coverage models of the capture volume. A user may choose a distance field and field gradient from a model with a conservative k-coverage setting, such as five cameras. If the vehicle 920 escapes the 5-covered capture volume, it may still remain controllable within a k−1 or k−2 covered volume.

The system 910 is not limited to any type of vehicle. As but one example, the system 910 can be used to control the flight of an electric helicopter within a motion capture volume. Helicopter operation is confined to a k-covered motion capture volume because its control relies on at least k cameras to continuously track the helicopter and maintain stable operation. Typically, a minimum of three cameras is used to track the helicopter at any point in 3D space. The motion capture computer 940 can provide real-time position and attitude information of the helicopter. The intelligent agent 922 uses one or more k-coverage models to keep the helicopter within the capture volume.

In another embodiment of the vehicle control system, the vehicle may be teleoperated instead of controlled by an on-board intelligent agent. Such a vehicle includes servos and a control loop that are responsive to commands transmitted by an RC transmitter. The commands may be generated in response to joystick movements.

However, when the vehicle moves outside or near the boundary of the capture volume, the motion capture computer uses the modeled capture volume to compute a command based on the field intensity and gradient at cell where the vehicle is located. The command is up-linked to the vehicle's servos and overrides any other command.

In both embodiments, the inner control loop and the containment field form a fly-by-wire system that provides augmented stability and envelope protection. Envelope protection limits the velocity of the vehicle and keeps it in the capture volume. Limiting the velocity prevents the helicopter from ramming through the envelope.

The invention claimed is:

1. A method comprising modeling a k-covered motion capture volume based on a configuration of motion capture sensors, the modeling including representing the k-covered capture volume with a distance field.

2. The method of claim 1, wherein the distance field is an adaptive distance field, the adaptive distance field providing a signed scalar field indicating whether a point is within the capture volume, on a boundary of the capture volume, or outside the capture volume.

3. The method of claim 1, wherein the modeling includes defining a k-coverage function based on the sensor configuration, and sampling the function.

4. The method of claim 2, wherein the adaptive distance field is a signed distance function, and wherein the function describes intersections of viewing volumes of the sensors.

5. The method of claim 4, wherein the sensors include motion capture cameras, and the viewing volumes have the shapes of frusta.

6. The method of claim 4, wherein the sampling includes encompassing the viewing volumes of the sensors with a root cell, performing a recursive subdivision of the root cell.

7. The method of claim 6, wherein a $k^{th}$ largest value of $f_i$ is used as an approximation to the distance to the capture volume's boundary, and wherein the recursive subdivision is guided by a sampling error.

8. The method of claim 6, wherein the distance function is evaluated only once for each viewing volume, whereby the model has O(n) complexity to compute.

9. The method of claim 6, wherein each cell in the modeled capture volume has a set of vertices, and wherein each vertex corresponds to a distance field.

10. The method of claim 6, wherein evaluations of h(p) and $\nabla$h(p) are combined for each leaf cell in the recursive subdivision.

11. The method of claim 3, wherein sampling is performed only for that portion of the capture volume above a floor plane.

12. The method of claim 1, further comprising storing the modeled capture volume in computer memory.

13. The method of claim 1, further comprising extracting an iso-surface of the modeled capture volume; and modeling the iso-surface with an adaptive distance field.

14. A motion capture system comprising a computer programmed to perform the method of claim 1.

15. The motion capture system of claim 14, wherein the computer renders the modeled capture volume; and wherein the computer is also programmed to provide a user interface that allows sensor configurations to be varied.

16. The motion capture system of claim 15, wherein the computer determines a bounding box for the modeled capture volume, and also determines the sensor configuration with respect to the bounding box.

17. Apparatus comprising a computer for generating a computational model of a k-covered motion capture volume based on a configuration of motion capture sensors, including representing the k-covered capture volume with a distance field.

18. A vehicle control system comprising a motion capture system for covering a capture volume; a computational model of k-covered motion capture volume, the model represented by a distance field; and a control for operating a vehicle within the modeled volume.

19. The system of claim 18, wherein if the vehicle moves within a preset distance of the capture volume's boundary, gradients from the model are accessed and used to generate commands for moving the vehicle back inside the capture volume.

20. The system of claim 18, wherein the motion capture system includes a motion capture computer for sending tracking information to the control; and wherein the control includes an intelligent agent for using the tracking information to generate control values for the vehicle's inner control loop and servos.

21. The apparatus of claim 17, wherein the modeling includes defining a k-coverage function based on the sensor configuration, and sampling the function.

22. The apparatus of claim 21, wherein sampling is performed only for that portion of the capture volume above a floor plane.

23. The apparatus of claim 17, wherein the distance field is an adaptive distance field, the adaptive distance field providing a signed scalar field indicating whether a point is within the capture volume, on a boundary of the capture volume, or outside the capture volume.

24. The apparatus of claim 23, wherein the adaptive distance field is a signed distance function, and wherein the function describes intersections of viewing volumes of the sensors.

25. The apparatus of claim 24, wherein the sensors include motion capture cameras, and the viewing volumes have the shapes of frusta.

26. The apparatus of claim 24, wherein the sampling includes encompassing the viewing volumes of the sensors with a root cell, performing a recursive subdivision of the root cell.

27. The apparatus of claim 17, wherein the computer is programmed to extract an iso-surface of the model; and model the iso-surface with an adaptive distance field.

28. The apparatus of claim 17, wherein the computer is programmed to render the model; and wherein the computer is further programmed to provide a user interface that allows sensor configurations to be varied.

29. The apparatus of claim 17, wherein the computer is further programmed to determine the sensor configuration with respect to a bounding box of the model.

30. The system of claim 18, wherein the distance field is an adaptive distance field, the adaptive distance field providing a signed scalar field indicating whether a point is within the capture volume, on a boundary of the capture volume, or outside the capture volume.

31. The system of claim 30, wherein the adaptive distance field is a signed distance function, and wherein the function describes intersections of viewing volumes of the motion capture system.

32. The system of claim 31, wherein the motion capture system includes motion capture cameras, and wherein the viewing volumes have the shapes of frusta.

* * * * *